United States Patent [19]

Antrobus

[11] Patent Number: 4,753,494
[45] Date of Patent: Jun. 28, 1988

[54] VEHICLE ANTILOCK BRAKING SYSTEMS

[75] Inventor: Philip M. Antrobus, Leamington Spa, United Kingdom

[73] Assignee: Automotive Products plc, Leamington Spa, England

[21] Appl. No.: 857,332

[22] Filed: Apr. 30, 1986

[30] Foreign Application Priority Data

May 1, 1985 [GB] United Kingdom ............... 8511068

[51] Int. Cl.$^4$ .................................. B60T 8/50
[52] U.S. Cl. ..................................... 303/119; 303/61; 303/68; 303/115
[58] Field of Search ................... 303/113-119, 303/61-63, 68-69, 100, 96, 98, 105, 106, 91-92, 110, 108; 188/181

[56] References Cited

U.S. PATENT DOCUMENTS

| | | |
|---|---|---|
| 3,494,671 | 2/1970 | Slavin et al. ..................... 303/115 X |
| 3,545,817 | 12/1970 | Yarber ............................. 303/108 X |
| 3,550,966 | 12/1970 | Leiber .............................. 303/119 |
| 3,752,537 | 8/1973 | Ochiai .............................. 303/115 |
| 3,768,519 | 10/1973 | Morse ............................. 303/118 X |
| 3,820,856 | 6/1974 | Adahan ........................... 303/117 |
| 3,854,501 | 12/1974 | Machek .......................... 303/119 X |
| 3,881,779 | 5/1975 | Machek .......................... 303/118 |
| 3,913,983 | 10/1975 | Sekiguchi ....................... 303/119 |
| 3,976,335 | 8/1976 | Sekiguchi ....................... 303/61 X |
| 4,030,759 | 6/1977 | Gemmellaro et al. .......... 303/119 |
| 4,035,034 | 7/1977 | Sekiguchi ....................... 303/115 |
| 4,036,534 | 7/1977 | Kondo et al. .................. 303/119 X |
| 4,349,876 | 9/1982 | Lindemann .................... 303/106 X |

FOREIGN PATENT DOCUMENTS

| | | |
|---|---|---|
| 2242746 | 3/1974 | Fed. Rep. of Germany ...... 303/119 |
| 1479003 | 7/1977 | United Kingdom . |
| 2174775 | 11/1986 | United Kingdom ............... 303/119 |

Primary Examiner—Douglas C. Butler
Attorney, Agent, or Firm—Solon B. Kemon

[57] ABSTRACT

A vehicle antilock braking system comprises a servo for varying the effort applied by a brake on a wheel of the vehicle, a valve being provided to selectively connect the servo to a source of relatively high pressure or a source of relatively low pressure, via passageways of relatively high or relatively low restriction, so that the servo may be controlled to reduce or reapply braking effort at relatively slow or fast rates, depending on the acceleration or deceleration of the wheel.

4 Claims, 6 Drawing Sheets

VEHICLE ANTILOCK BRAKING SYSTEMS

BACKGROUND TO THE INVENTION

The invention relates to vehicle antilock braking systems. In a system comprising servo means for varying the effort applied to a brake and valve means controlling the supply of fluid to and/or from the servo means to effect the variation in effort, it is known to modulate the supply, for example, by a pulsed on/off control with pulse width modulation. Such a system is limited by the response of the valve means.

SUMMARY OF THE INVENTION

According to one aspect of the invention a vehicle antilock braking system comprises servo means for varying the effort applied to a brake on a wheel of the vehicle, valve means for controlling the flow of fluid between the servo means and a source of relatively high or relatively low pressure to effect the variation in effort, the valve means including passages of relatively high and relatively low restriction for connecting each source of pressure to the servo; and control means operatively connected to the valve means such that during an antilock control cycle in which the servo means operates to at least partially release and then re-apply the brake, the control means switches from a passage of relatively high restriction to a passage of relatively low restriction when the rate of change of wheel velocity reaches a predetermined magnitude.

Preferably the control means will select a passage of relatively high restriction when the rate of change of wheel velocity remains below the predetermined magnitude and selects a passage of relatively low restriction when the rate of change of wheel velocity reaches a predetermined magnitude. The rate of change of velocity referred to herein is taken as the scalar value and consequently wheel acceleration or deceleration are considered as positive value.

The valve means will control flow of fluid between the servo means and the sources of high and lower pressure to effect a decrease in brake effort on wheel deceleration and an increase in braking effort on wheel acceleration.

The control means will preferably select a first passage of relatively high restriction when the wheel deceleration remains below a first predetermined magnitude and selects a first passage of relatively low restriction when the wheel deceleration reaches the first predetermined magnitude.

Preferably, the control means re-selects the first passage of relatively high restriction when the wheel deceleration reaches a predetermined condition such as a maximum or another predetermined magnitude.

Alternatively or additionally, the control means will preferably select a second passage of relatively high restriction when the wheel acceleration remains below a second predetermined magnitude and selects a second passage of relatively low restriction when the wheel acceleration reaches the second predetermined magnitude. Preferably the control means re-selects the second passage of relatively high restriction when the wheel acceleration reaches another predetermined condition such as a third predetermined magnitude.

Conveniently said first and second passages of relatively high restriction are combined as are said first and second passages of relatively low restriction. Alternatively, the passages of high restriction may be of different restriction.

BRIEF DESCRIPTION OF THE DRAWINGS

The invention is now described, by way of example only, with reference to the accompanying drawings, in which.

DESCRIPTION OF A PREFERRED EMBODIMENT

Figure 1:
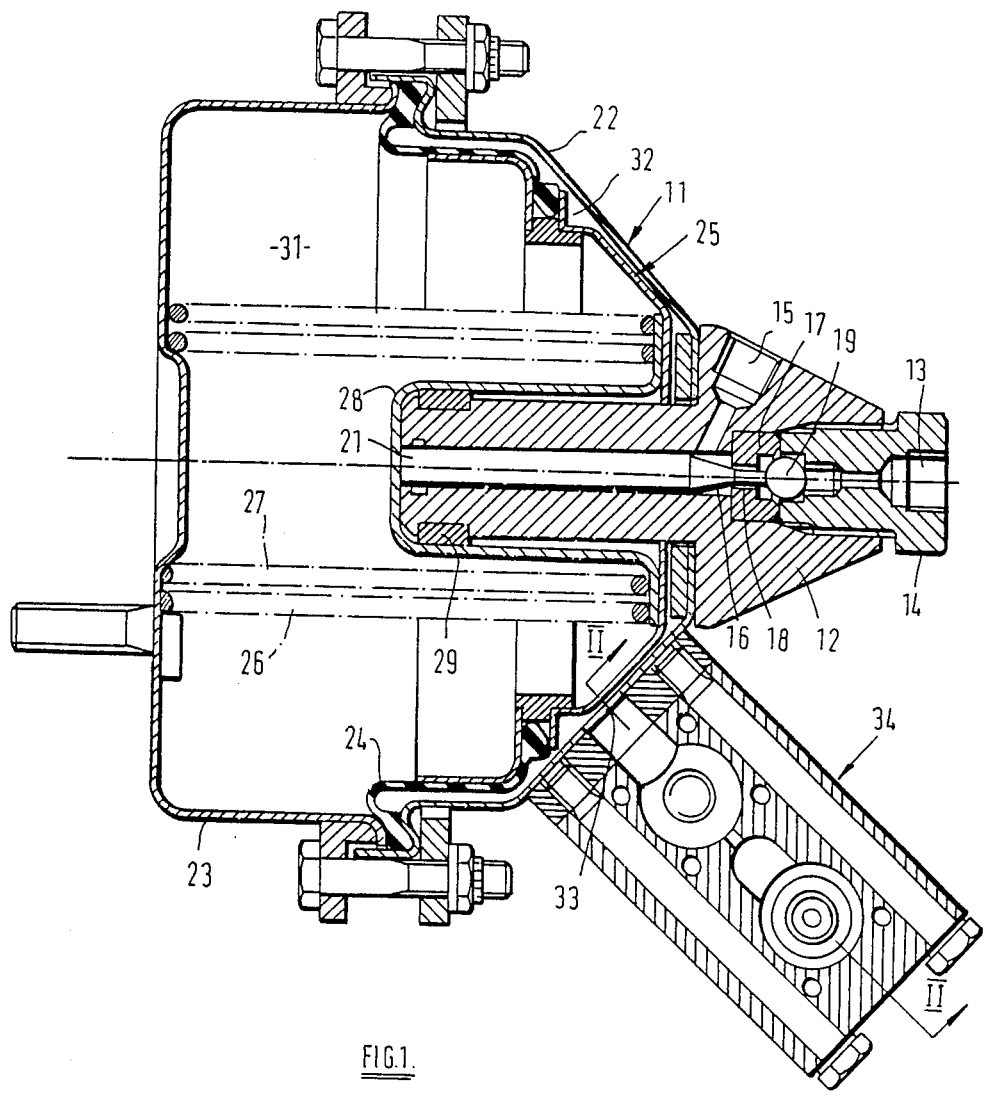
FIG. 1 is a cross-section through servo means and valve means for use in a vehicle antilock braking system according to the invention.
Figure 2:
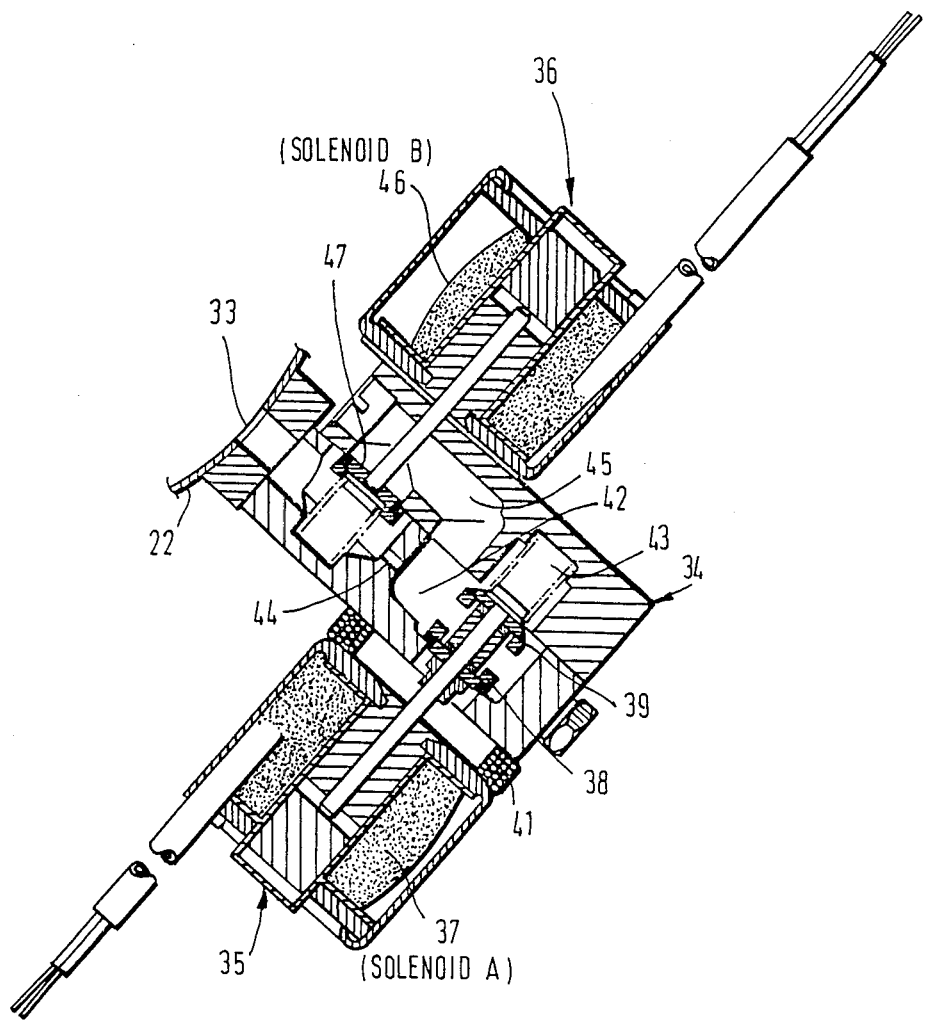
FIG. 2 is a cross-section on line II—II in FIG. 1.

Referring to FIGS. 1 and 2, the servo means 11 comprises a cylinder body 12 having an inlet port 13 in a screwed-in end plug 14 and an outlet port 15 opening into a bore 16. A valve seat member 17 is secured by the end plug 14 and has a control port 18 which can be closed by a ball 19. A control plunger 21 is slidable in the bore 16 and in the position shown in FIG. 1 is operative to unseat the ball 19 against a light compression spring and open communication between the inlet port 13 and the outlet port 15.

The cylinder body is secured to a conically dished casing portion 22 which is itself secured at its outer rim to the outer rim of another dished casing portion 23. A flexible diaphragm 24 is secured at its outer periphery between the outer rims of the casing portions 22 and 23 and at its inner rim to a piston portion 25.

Two helical compression springs 26 and 27 act between the end wall of casing portion 23 and a dished plunger 28 which is guided on the cylinder body by a bearing ring 29 and reacts on the end of the cylinder body 12 and the end of the plunger 21 remote from the end plug 14.

The diaphragm 24 and piston 25 separate two chambers 31 and 32 within the casing portions 22 and 23. Chamber 31 is connected to a source of vacuum through a port (not shown) in casing portion 23 whilst chamber 32 is selectively connected to the source of vacuum or to atmosphere through a port 33 in casing portion 22 and valve means 34 secured to casing portion 22.

The valve means 34 includes a pair of solenoid valves 35 and 36. Solenoid valve 35 comprises a solenoid 37 (solenoid A) which actuates a pair of valve members 38 and 39. Valve member 38 controls flow from atmosphere through a filter 41 into a passage portion 42 whilst valve member 39 controls flow from the passage portion 42 into a passage portion 43 housing a return spring and through a port (not shown) connected to the source of vacuum. With the solenoid A off (de-energised) valve member 38 is seated and valve member 39 unseated. With solenoid A on (energised) valve member 38 is unseated and valve member 39 is seated.

Flow between passage portion 42 and port 33 is through a restrictor orifice 44 in parallel with a by-pass passage 45 controlled by solenoid valve 36 which comprises a solenoid 46 (solenoid B) and a valve member 47. Passages 45 is closed by valve member 47 when solenoid B is off (de-energised) and open when solenoid B is on (energised).

In use, the inlet port 13 is connected to a brake hydraulic master cylinder and the outlet port 15 is connected to a wheel cylinder which acts to apply a brake to a wheel of the vehicle. If solenoid A is off, chamber 32 is subject to vacuum, as is chamber 31, so springs 26 and 27 act on the plunger 21 to keep the inlet port 13 and outlet port 15 in communication. If solenoid A is on, air enters chamber 32 through the filter 41 and port 33 and this air acting on the diaphragm 24 and piston 25 adds to a force from plunger 21 caused by brake pressure at outlet port 15 to move the dished plunger 28 against the force of springs 26 and 27, allowing the ball 19 to seat and reducing brake pressure.

Figure 3:
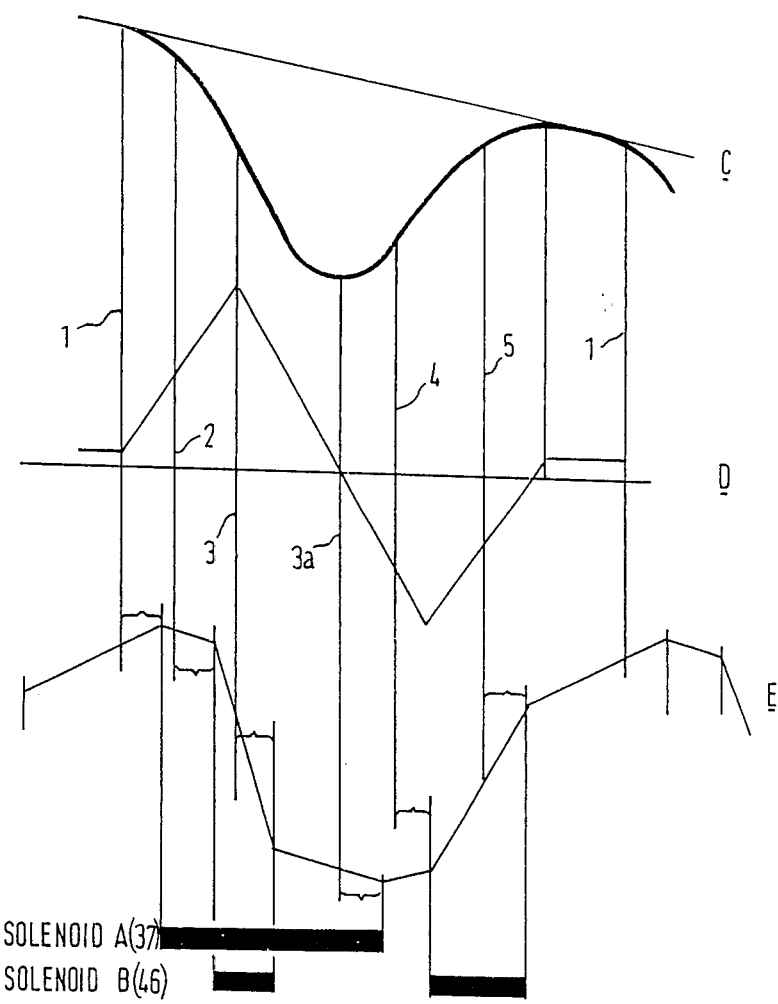
FIG. 3 is a graph showing plots of wheel speed (C), wheel deceleration (D) and brake pressure (E) plotted against time.

The solenoid valves 35 and 36 are controlled by control means (not shown) comprising wheel speed monitoring and logic circuits which produce outputs at the solenoids 37 and 46 according to the annotation to the curves shown in FIG. 3. The upper curve (C) shows wheel speed, the central curve (D) shows wheel deceleration and the lower curve (E) shows brake pressure, all plotted against time.

At time (1) the wheel deceleration has risen above a fixed magnitude, eg. 1.5 g, and solenoid A is switched on to reduce brake pressure. There is an inevitable delay before this shows as a reduction in pressure which occurs at a slow rate since solenoid B is off and air can only flow into chamber 32 through the restrictor 44.

When wheel deceleration rises above a first predetermined magnitude, eg. 2.5 g, at time (2) solenoid B is energised to open the by-pass passage 45 and causes brake pressure to be reduced at a high rate.

When wheel deceleration reaches a predetermined condition, eg. a maximum, at time (3) solenoid B is switched off and the rate of reduction of brake pressure reverts to slow.

When the wheel starts to accelerate, at time (3a) solenoid A is switched off and the brake pressure starts to rise at a slow rate, since air can only be exhausted from chamber 32 through the restrictor 44, solenoid B still being off. At a second predetermined magnitude of wheel acceleration, eg. 2 g, the control means switches solenoid B on at time (4) and allows pressure to rise at a fast rate through the by-pass passage 45.

When the wheel acceleration reaches another predetermined condition such as a third predetermined magnitude, eg 1 g, at time (5) solenoid B is switched off to give a slow pressure rise.

Figure 4:
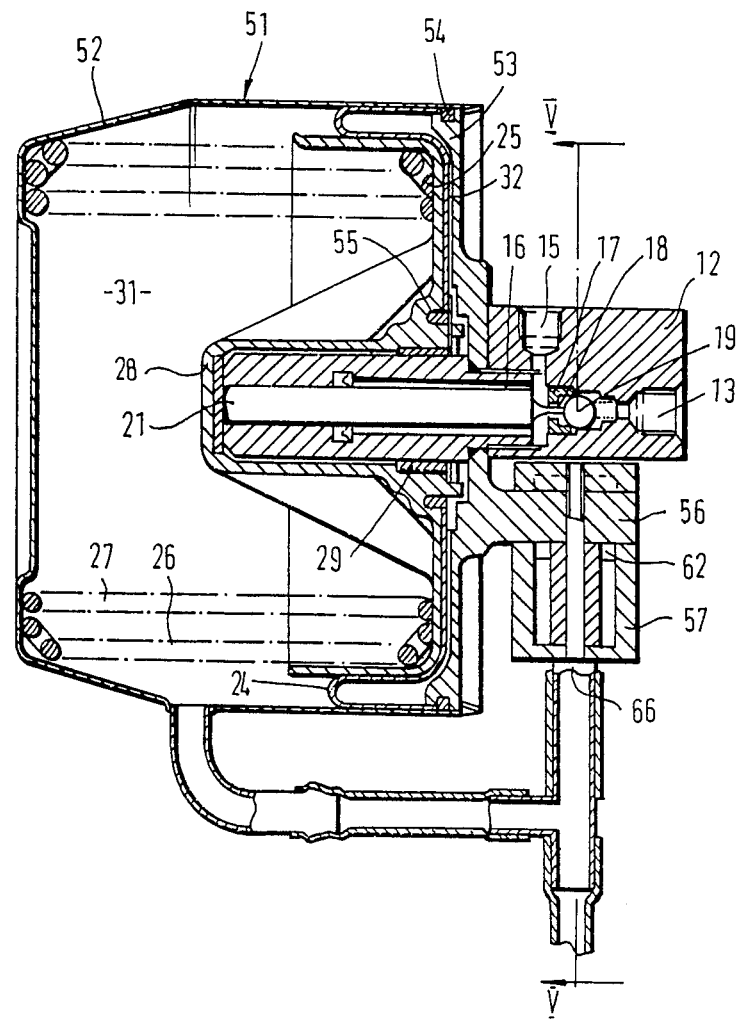
FIG. 4 is a cross-section through an alternative servo means/valve means for use in a vehicle antilock braking system according to the invention.
Figure 5:
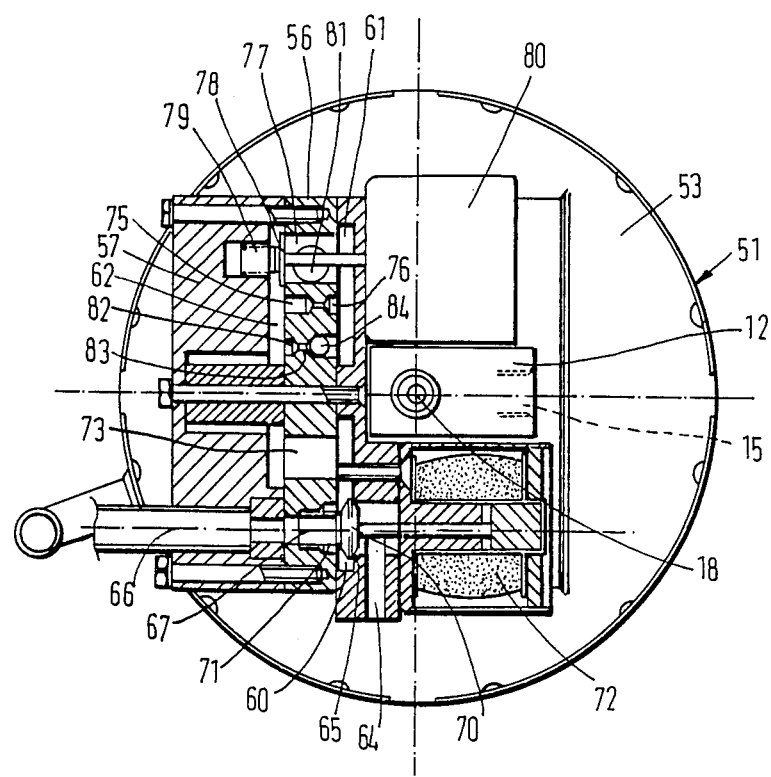
FIG. 5 is a cross-section along the line V—V in FIG. 1.

In the embodiment illustrated in FIGS. 4 and 5, the servo means 51 is similar, subject to various modifications detailed below, to the servo means 51 illustrated in FIGS. 1 and 2, and the same reference numerals have been used for similar components.

In servo means 51, the chambers 31 and 32 are defined by a dish-shaped casing 52, the open end of which is closed by a moulded plastic closure member 53. The cylinder body 12 is mounted through the closure member 53 so that it projects co-axially into the casing 52. The piston 25 and dished plunger 28 are of integral moulded plastic construction. Diaphragm 24 is secured at its outer periphery between the closure member 53 and casing 52 in a circular groove 54, and at its inner periphery to the piston 25 in groove 55, thereby separating the two chambers 31 and 32.

A valve block 56 is formed integrally of the closure member 53. A valve housing 57 is clamped about the valve block 56 to define a pair of chambers 60 and 61 on one side of the valve block 56 and a third chamber 62 on the other side of the valve block 56. The housing also defines a first port 64 which opens into chamber 60 via valve seat formation 65, and a second port 66 which opens into chamber 60 via a bore 67 through the valve block 56, the bore 67 being co-axial with the valve seat formation 65. A valve member 70 is provided between the valve seat formation 65 and the bore 67. A spring 71 urges the valve member 70 into engagement with the seat formation 65 to close port 64. A solenoid 72 (solenoid A) is arranged to move the valve member 70 against the spring 71 away from the seat formation 65 and into engagement with the valve block 56, thereby opening port 64 and closing bore 67.

The chamber 60 is connected to chamber 62 by means of bore 73 through the valve block 56. A bore 75 with restrictor orifice 76 is provided through the valve block 56 to connect chamber 62 with chamber 61. A second bore 77 of very much larger diameter, is provided in parallel with bore 75 between chambers 62 and 61. The end of bore 77 adjacent chamber 62 is closed by a valve member 78 which is urged into engagement with the valve block 56 by a spring 79. A solenoid 80 (solenoid B) is arranged to move valve member 78 against the spring 79, thereby opening bore 77 to chamber 62. A transverse bore 81 though the valve block 56 connects bore 77 with chamber 32 of the servo means 51.

A third bore 82 with restrictor orifice 83 is also provided between chambers 62 and 61. This third bore 82 is provided with a non-return ball valve 84, which seats towards the chamber 62.

In operation, chamber 31 of the servo means 51 and port 66 of the valve will be connected to vacuum via line 90 and the port 64 of the valve will be open to atmosphere. With both solenoids A and B off (as illustrated in FIGS. 4 and 5) port 66 is connected via bore 67, chamber 60, bore 73, chamber 62, bore 75, chamber 61, bore 77 and bore 81 to chamber 32 of the servo means 51 the bore 77 being closed by valve member 78 and bore 82 being closed by non-return valve 84. This provides a path of relatively high restriction which provides a relatively slow rate of reduction in pressure in the chamber 32. By actuating solenoid B, chamber 62 is connected directly to bore 81 via the relatively large diameter bore 77, thereby producing a passage of relatively low restriction and speeding up the rate of reduction of pressure in chamber 32. Similarly, with solenoid A energised, chamber 32 will be connected to atmosphere and solenoid B may be used to provide passages of high and low restriction. However, in this case, when solenoid B is not energised, air will be transmitted from chamber 63 to chamber 61 via bore 82, as well as bore 75. The slow rate at which pressure is increased in chamber 32 will consequently be higher than the slow rate at which pressure is reduced.

Figure 6:
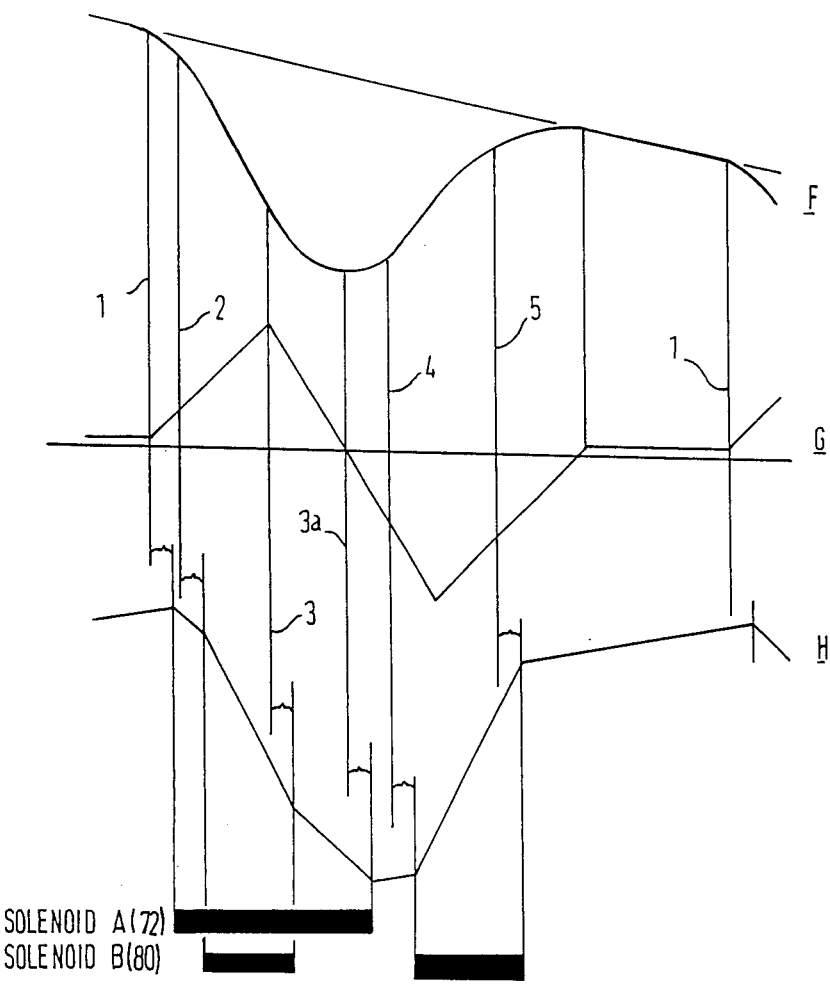
FIG. 6 is a graph showing plots of wheel speed (F), wheel deceleration (G) and brake pressure (H) against time.

As illustrated in FIG. 6,. this embodiment may be operated in the same manner as the embodiment illustrated in FIGS. 1 and 2, the only difference being the increase in the slow rate of reduction of pressure between times (1) and (2) and (3) and (3a), as compared with FIG. 3. The provision of passages of relatively high and relatively low restriction controlled through solenoid B in the above embodiments gives a reasonably accurate control of brake pressure without a need for sophisticated pressure control using pulse width modulation. Such controls usually require two solenoid valves to separately control inlet and exhaust. Pulse width modulation control requires a high electrical power and the solenoid valves have to be small (and hence restrictive) if an acceptable frequency response is to be achieved.

I claim:

1. A vehicle antilock braking system including a pressure differential servo actuator means for modulating the effort applied to a brake on a wheel of the vehicle in response to wheel deceleration/acceleration and a fluid valve means for selectively connecting a pressure control chamber of the servo actuator means to a source of high pressure fluid or a source of low pressure fluid, said valve means comprising:
 a first solenoid operated valve element movable between a first position in which a valve chamber is connected to the source of high pressure fluid and a second position in which the valve chamber is connected to the source of low pressure fluid;
 first solenoid means for moving said first valve element between its first and second positions;
 a second separate solenoid operated valve element movable between a first position in which the valve chamber is connected to the pressure control chamber of the servo actuator by a first passage means of high restriction and a second position in which the valve chamber is connected to the pressure chamber of the servo actuator by a second passage means of low restriction, said first passage means including flow control means which will vary the restriction of the first passage means depending on whether the valve chamber is connected to the source of high pressure fluid or the source of low pressure fluid; and
 second solenoid means for moving said second valve element between its first and second positions.

2. A vehicle antilock braking system according to claim 1 in which the valve chamber is permanently connected to an outlet by which the valve is connected to the pressure chamber of the servo actuator by a first restricted bore, a second bore of relatively large cross-section by passing said first bore; the second valve element being arranged selectively to open and close said second bore, so that when the valve element is closed, the first bore will provide a passage of high restriction and when the valve element is open the first and second bores will provide a passage of low restriction.

3. A vehicle antilock braking system according to claim 2 in which a third bore of high restriction by-passes the first bore, said third bore incorporating a non-return valve which will close the third bore in one direction.

4. A vehicle antilock braking system according to claim 1 in which each of the valve elements is moved between its first and second positions by an individual solenoid.

* * * * *